(12) United States Patent
Wilbur, Jr.

(10) Patent No.: US 6,638,130 B2
(45) Date of Patent: Oct. 28, 2003

(54) MASK FRAME WELDING JIG AND METHOD OF USING SAME

(75) Inventor: Leonard Pratt Wilbur, Jr., Lancaster, PA (US)

(73) Assignee: Thomson Licensing S. A., Boulogne Cedex (FR)

( * ) Notice: Subject to any disclaimer, the term of this patent is extended or adjusted under 35 U.S.C. 154(b) by 523 days.

(21) Appl. No.: 09/742,618

(22) Filed: Dec. 21, 2000

(65) Prior Publication Data

US 2002/0081933 A1 Jun. 27, 2002

(51) Int. Cl.⁷ .................................................. H01J 9/14
(52) U.S. Cl. .......................................... 445/30; 445/68
(58) Field of Search ..................... 445/30, 68; 313/402, 313/403, 404, 405, 406, 407

(56) References Cited

U.S. PATENT DOCUMENTS 5,348,506 A * 9/1994 Kawamura et al. ........... 445/30

* cited by examiner

Primary Examiner—Kenneth J. Ramsey
Assistant Examiner—Joseph Williams
(74) Attorney, Agent, or Firm—Joseph S. Tripoli; Joseph J. Laks; Carlos M. Herrera

(57) ABSTRACT

A method and apparatus for attaching a tension mask to a mask frame. The apparatus is comprised of a clamping plate upon which is mounted a frame clamp and a frame deflector assembly. Above the clamping plate is located a mask clamp assembly comprising a forming slide. A mask frame is inserted into the frame clamp and secured on a plurality of axes to the top of the clamping plate. As the mask frame is secured, a compression force is applied to the mask frame by the frame deflector assembly and a tension mask is aligned and positioned to the top of the mask frame. While the mask frame is in compression, a forming edge on the forming slide conforms an edge of the tension mask to the mask frame where it is then affixed. The compression force on the mask frame is then released causing the frame to impart a tension force on the tension mask.

9 Claims, 3 Drawing Sheets

MASK FRAME WELDING JIG AND METHOD OF USING SAME

This invention generally relates to color picture tubes and, more particularly, to a method and apparatus for affixing tension masks to mask frames for a color picture tube.

BACKGROUND OF THE INVENTION

A conventional color picture tube comprises a glass faceplate panel, a funnel attached to the panel by a glass frit, and an electron gun within the neck of the funnel for emitting red, green, and blue electron beams. An aperture mask, or otherwise known as a shadow mask, which may be either a formed mask or a tension mask, is interposed between the gun and the screen and secured to the panel by a shadow mask frame. The electron beams emitted from the electron gun pass through the apertures in the shadow mask and strike a phosphor screen applied to the inner surface of the panel. The electron beams cause the phosphors to emit light so that an image is displayed on the panel.

A shadow mask is a thin sheet of metal, such as steel, that is contoured to somewhat parallel the inner surface of the tube faceplate. A tension mask can be a strand tension mask, tiebar tension mask or a tension focus mask. A tension focus mask comprises an array of strands and perpendicular crosswires overlying the strands and separated by an insulator. The strands and crosswires form the apertures in the mask through which electron beams emitted from the electron gun pass. Different voltages are applied to the strands and crosswires to create multiple focusing lenses in each of the mask apertures. Generally, in a tension focus mask, the strands are vertically oriented and supported in tension by the shadow mask frame.

In tension mask assemblies, because the mask must be affixed to the frame under tension and the mask strands must be positioned such that they are parallel and uniformly spaced from each other, it is desirable to employ a jig or fixture during the manufacture of the mask frame assembly to attain the correct tensioning and strand spacing. Ideally, the jig or fixture would secure a mask frame; thus, allowing a tension mask to be positioned and aligned, after which the tension mask would be formed to the mask frame and welded in place. Such a jig or fixture is desirable in manufacturing because it allows mask frame assemblies to be assembled in a repetitively precise manner.

SUMMARY OF THE INVENTION

The present invention provides a method and apparatus for precisely welding a tension mask to a mask frame. The apparatus includes a base clamping plate element upon which is disposed a set of clamps for holding a mask frame, a forming element is included to form a tension mask to a mask frame, a frame deflector is also included in the apparatus to deflect the vertical component of the mask frame to a desired position under clamping pressure, and finally, a welding port aperture is disposed within the mask forming element. The method of the invention includes clamping a mask frame to the clamping plate element and then engaging a frame deflector to deflect the mask frame to a desired position under clamping pressure. The tension mask is then aligned to the mask frame. The mask forming element is then engaged and forms the tension mask around the vertical component of the mask frame. After the tension mask has been formed to the mask frame, the tension mask is securely held in place and welded to the mask frame by tack, seam or spot welding so as to securely affix the mask to the mask frame. After the assembly has sufficiently cooled from welding, all clamps are removed and the completed mask frame assembly is removed from the fixture.

DETAILED DESCRIPTION

Figure 1:
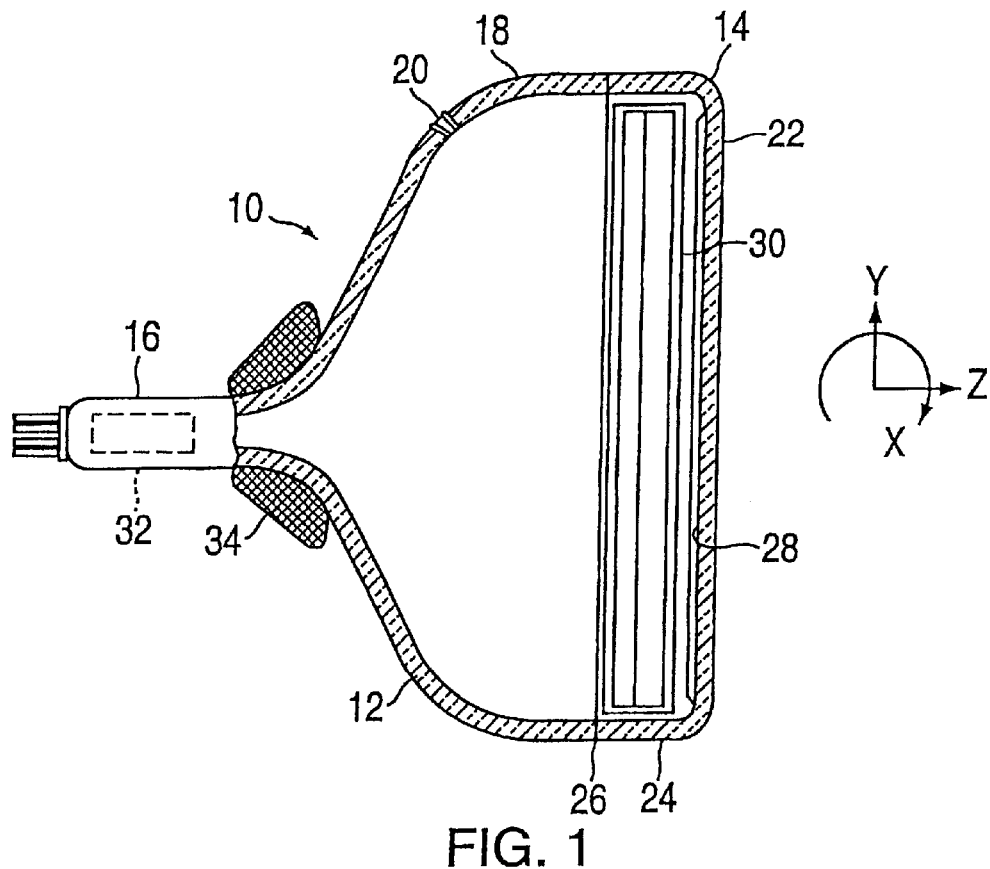
FIG. 1 is a side view, partially in the axial section, of a color picture tube, including a tension focus mask frame assembly according to the present invention.

FIG. 1 shows a cathode ray tube 10, such as a color television picture tube or a monitor, which includes an evacuated glass envelope 12. The envelope 12 comprises a rectangular glass faceplate panel 14, and a tubular neck 16, and an interconnecting funnel 18. The funnel 18 has an internal conductive coating (not shown) that extends from an anode button 20 to the neck 16. The panel 14 comprises a viewing surface 22 and a peripheral flange or sidewall 24 that is sealed to the funnel 18 by a glass frit 26. A three-color phosphor screen 28 is carried by the inner surface of the faceplate panel 14. The screen 28 is a line screen with phosphor lines arranged in triads, each triad including a phosphor line each of which emits one of the three primary colors of light when impacted by three electron beams. A tension mask 30 is removably mounted in a predetermined spaced relation to the screen 28. An electron gun 32 (schematically shown by the dashed lines in FIG. 1) is centrally mounted within the neck 16 to generate three in-line electron beams, a center beam and two side beams, along convergent paths through the mask 30 to the phosphor lines on the screen 28.

The tube 10 is designed to be used with an external magnetic deflection yoke, illustrated as yoke 34 shown in the neighborhood of the funnel to neck junction. When activated, the yoke 34 subjects the three beams to magnetic fields causing the beams to scan horizontally and vertically in a rectangular raster over the screen 28.

Figure 2:
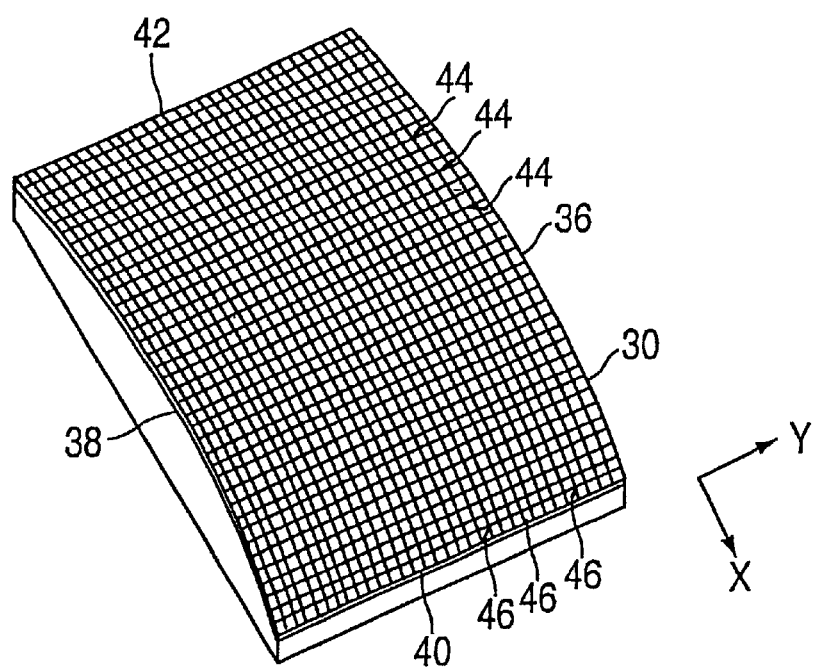
FIG. 2 is a perspective view of the tension focus mask frame assembly of FIG. 1.

The tension mask 30, shown in greater detail in FIG. 2, includes two long sides 36 and 38 and two short sides 40 and 42. The two long sides 36 and 38 of the mask parallel a central major axis, x, of the tube. The tension mask 30 includes strands 44 that are parallel to the central horizontal minor axis y and to each other; and crosswires 46, that are parallel to the vertical central major axis x and to each other. The crosswires 46 are coupled to busbars (not shown) on their distal ends to provide tension as well as voltage to the crosswires. In a preferred embodiment for a tension focus mask, the strands 44 are flat strips that extend vertically, having a width of about 13 mils and a thickness of 2 mils, and the crosswires 46 have a round cross section, having a diameter of about 1 mil and extend horizontally across the strands 44. In the completed tension mask 30, the strands 44 and crosswires 46 are separated from each other by a suitable insulator such as a lead-based frit. However, the teachings of this invention can be employed in a strand tension mask system or a tension focus mask system.

Figure 3:
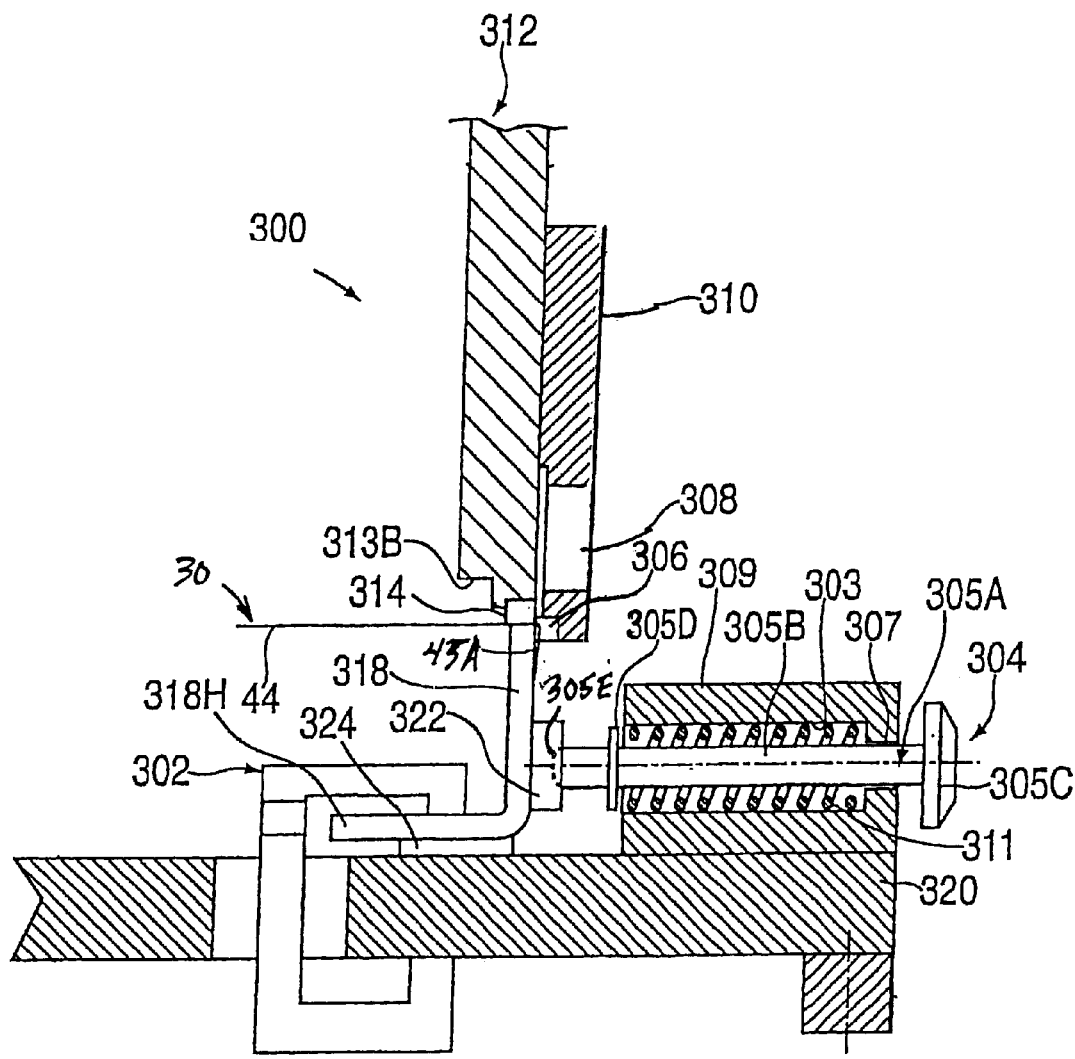
FIG. 3 is a cross-sectional view of the mask frame welding jig illustrating the manner of fabricating a mask frame assembly by welding a tension mask to a mask frame.

FIG. 3 depicts a cross-sectional view of the welding jig 300 illustrating the manner of attaching strands 44 to a mask frame 318 to form a mask frame assembly 301. The jig 300 comprises a base clamping plate 320 upon which is disposed a frame clamp 302, a seating plate 324, and a frame deflector assembly 304. In practice, two welding jigs 300 are employed to the mask frame 318 with one at each terminal ends of the strands 44.

The operation begins with the insertion of the mask frame 318 into the two jigs 300. The frame clamp 302 is formed to accept and hold the horizontal segment 318H of the mask frame 318 to the base clamping plate 320. The frame deflector assembly 304 is comprised of a plunger 305A having a plunger shaft 305B with two respective ends. The first end having a plunger head 305C and the second end comprising a plunger flange 305D and a plunger tip 305E. The plunger tip 305E is inserted in the contact plate 322. A compression spring 311 is slid over the plunger shaft 305B and retained by the plunger flange 305D. The plunger shaft 305B and compression spring 311 are placed into the frame deflector bore 303. An aperture 307 at the end of the frame deflector bore 303 allows the plunger shaft 305B to protrude outside the plunger housing 309 while preventing the compression spring 311 from exiting the plunger housing 309. With the horizontal segment 318H secured, the contact plate 322 on plunger tip 305E of the frame deflector assembly 304 engages the vertical components on opposed sides of the mask frame 318. The vertical components of the mask frame 318 is deflected inwardly along the y axis of the tension mask under a nominal force applied by the spring 311 or by applying an extraneous force to the plunger head 315C.

While the vertical components of the mask frame 318 is temporarily deflected, the long sides 36 and 38 of the tension mask 30 is then accurately positioned on top of the vertical component of the mask frame 318 such that a portion of the tension mask 30 overhangs the edge of the mask frame 318.

Located above the base clamping plate 320 is a mask clamping assembly 312 having a contact point 314. The contact point 314 is molded of hard urethane. A second element that is disposed above the clamp plate 320 is the forming slide 310. Forming slide 310 has a forming edge 306, molded of hard urethane. Another element of the forming slide 310 is a welding port 308. This welding port 308 is disposed horizontally through forming slide 310 and is formed such that it can accommodate a plurality of various types of welding devices. In the case of a resistance wheel rolling welder being employed, the port 308 would be formed in the shape of a large slot.

With the tension mask 30 positioned on the deflected vertical components of the mask frame 318 and the frame deflector assembly 304 engaged, the mask clamping assembly 312 is lowered to securely hold the tension mask strands 44 to the top surface 326 of the mask frame 318 by transmitting force from the vertical clamping assembly 312 through the clamping surface 314 to the top surface 326.

Figure 4:
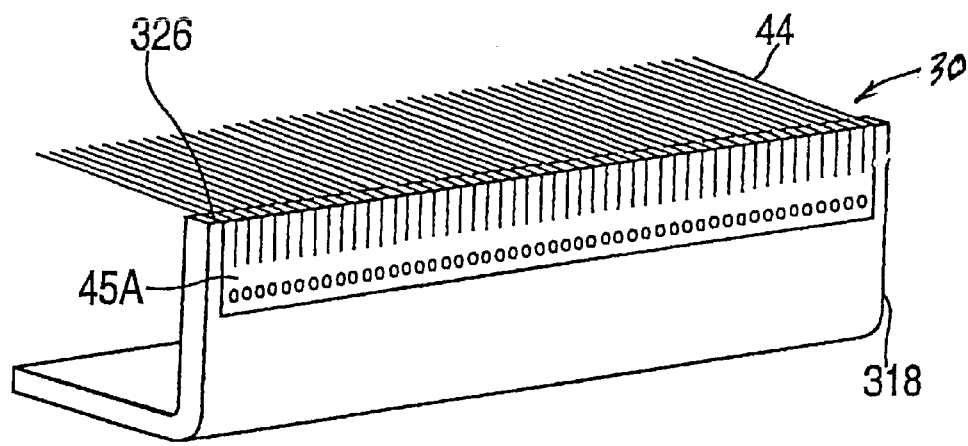
FIG. 4 is a perspective view of a tension mask formed and welded to a mask frame.
Figure 5:
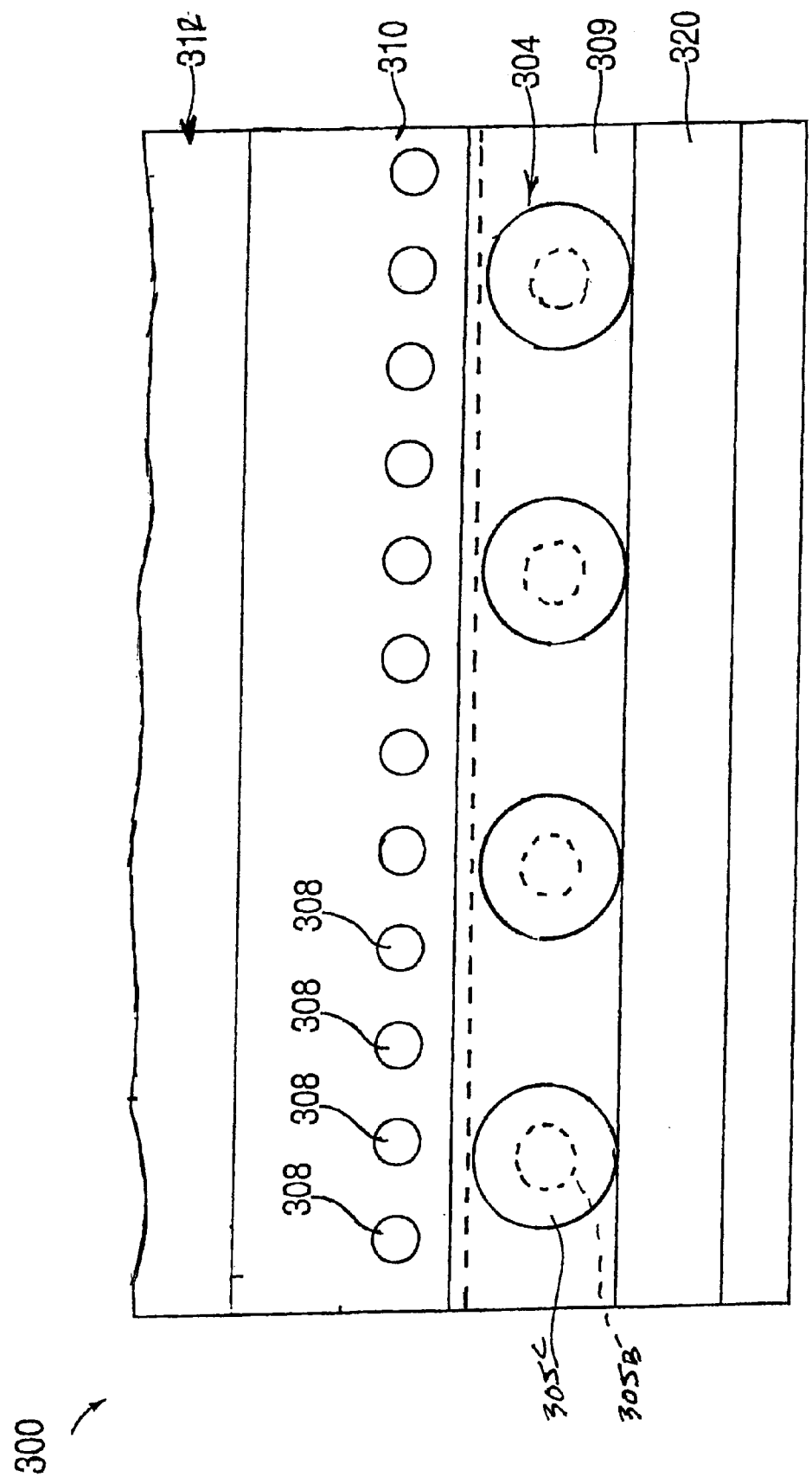
FIG. 5 is a partial side view of the mask frame welding jig according to the present invention.

With the strands 44 secured to the top surface 326, the forming slide 310, which may be staggered with respect to the frame deflector assembly 304 so as to not interfere with the frame deflector assembly 304, moves vertically downward to force down the overhanging section of the tension mask 30 (as shown in FIG. 5). Enough pressure is exerted on the forming slide 310 to force the tension mask 30 to come in contact with the forming edge 306. The forming edge 306 forces the tension mask 30 to conform to the contour of the vertical component of the mask frame 318. The end 45A (shown in FIG. 4) of the tension mask 30 terminates above the contact plate 322.

The welding port 308 on the forming slide 310 is aligned such that a welder can make contact with the tension mask 30. Any one of a number of welding devices may be employed to weld the end 45A of tension mask 30 to the mask frame 318. These welding devices include but are not limited to spot, seam and rolling resistance wheel welding. The welding device is placed through welding port 308 making contact with the end of the tension mask 30 and mask frame 318. When activated, the welding device forms a weld between the tension mask 30 and the mask frame 318. After welding, the forming slide 310 with associated components thereto and the mask clamping assembly 312 are raised and as such are no longer in contact with the mask frame 318 and the tension mask 30.

Next, the frame deflector assembly 304 is released from the vertical component of the mask frame 318; consequently, the vertical component of the mask frame 318 on the two long sides 36 and 38 of the mask frame 318 relaxes to a position close to its original orientation, thereby tensioning the strands 44 along the vertical y axis. If spot resistance welding is desired, all of the welds may be formed at once, however, if seam or rolling resistance wheel welding is desired, the welds may be formed at intervals. The welding jig 300 prevents movement of the strands 44 during the welding process, therefore, it is unimportant whether the end 45A of the tension mask 30 is welded entirely at once or in sections.

As can be seen in FIG. 4, the tension mask 30 is welded to mask frame 318. The weld points are represented as the plurality of dots along the end 45A of the tension mask 30. By simultaneously clamping and welding both sides of the tension mask 30 to the mask frame 318, tension may be imparted to the strands 44. Also, by imparting tension to the strands 44 at this time, the strands 44 are kept parallel and uniformly spaced across the array.

As the embodiments that incorporate the teachings of the present invention have been shown and described in detail, those skilled in the art can readily devise many other varied embodiments that still incorporate these teachings without departing from the spirit of the invention. For example, although a tension mask has been shown, the welding jig of this invention may be used for constructing any shadow mask requiring a constant tension by the mask frame.

What is claimed is:

1. A mask frame welding jig comprising:
    a frame deflector assembly, said frame deflector assembly comprising a contact plate for contacting and applying force to opposed sides of the mask frame; and,
    a mask clamping assembly for forming a tension mask to the mask frame about the opposed sides of the mask frame.

2. The mask frame welding jig of claim 1, further comprising a base clamping plate for securing said frame deflector assembly.

3. The mask frame welding jig of claim 2, further comprising a clamp for securing the mask frame to said based clamping plate.

4. The mask frame welding jig of claim 1, wherein said frame deflector assembly further comprises a plunger attached to said contact plate, said plunger being biased to apply compression force on said mask frame through said contact plate.

5. The mask frame welding jig of claim 1, wherein said mask clamping assembly further comprises a forming slide, said slide having a forming edge where said forming edge of said forming slide is adapted to frictionally engage said tension mask and form said tension mask to said mask frame.

6. The mask frame welding jig of claim 1, wherein said mask clamping assembly further comprises a welding port for supporting a welding device.

7. A method for welding a shadow mask to a mask frame comprising:

applying a compression force to the opposed sides of said mask frame in a direction toward at least one pair of opposed sides of said mask frame;

forming a shadow mask onto said mask frame while the mask frame is in compression;

welding said shadow mask to said opposed sides of said mask frame; and, releasing said compression force after welding.

8. The method of claim 7, wherein said welding is performed by rolling a roller electrode along said opposed sides of said mask frame while said shadow mask is in contact with said mask frame.

9. The method of claim 7, wherein said forming is performed by a forming slide, said forming slide comprising a forming edge adapted to slide against said shadow mask and form said shadow mask to the exterior surface of said mask frame.

* * * * *